US009127485B2

(12) United States Patent
Ridenour

(10) Patent No.: US 9,127,485 B2
(45) Date of Patent: Sep. 8, 2015

(54) SECURITY DEVICE FOR ELECTRICAL CONDUCTORS IN A CONDUIT

(71) Applicant: Kristopher M. C. Ridenour, Phoenix, AZ (US)

(72) Inventor: Kristopher M. C. Ridenour, Phoenix, AZ (US)

( * ) Notice: Subject to any disclaimer, the term of this patent is extended or adjusted under 35 U.S.C. 154(b) by 214 days.

(21) Appl. No.: 13/906,664

(22) Filed: May 31, 2013

(65) Prior Publication Data

US 2014/0352368 A1 Dec. 4, 2014

(51) Int. Cl.

| | |
|---|---|
| ***F16M 13/00*** | (2006.01) |
| ***E05B 65/00*** | (2006.01) |
| ***E04H 12/00*** | (2006.01) |

(52) U.S. Cl.

CPC ............ *E05B 65/0064* (2013.01); *E04H 12/00* (2013.01); *E04H 12/003* (2013.01); *Y10T 70/30* (2015.04)

(58) Field of Classification Search

CPC ... E04H 12/00; E04H 12/003; E05B 65/0065; Y10T 70/30; H02G 9/06; H02G 22/10

See application file for complete search history.

(56) References Cited

U.S. PATENT DOCUMENTS

| | | | | |
|---|---|---|---|---|
| 4,518,817 | A * | 5/1985 | Kirby et al. | 174/38 |
| 7,560,642 | B2 * | 7/2009 | Ygnelzi et al. | 174/45 R |
| 7,884,283 | B1 * | 2/2011 | Ousley | 174/45 R |
| 8,935,844 | B2 * | 1/2015 | Ramgattie | 29/527.2 |
| 2012/0230004 | A1 * | 9/2012 | Atchley | 361/825 |

* cited by examiner

*Primary Examiner* — Amy Sterling

(74) *Attorney, Agent, or Firm* — The von Hellens Law Firm, Ltd.

(57) ABSTRACT

A bracket encircles a conduit or lamp post and includes an opening for access to a cover attached to the conduit or lamp post and serves as a security device to prevent access to the electrical conductors behind the cover. A removable plate having a bottom edge engaged within a channel extends across the opening of the bracket. A tang extends from the bracket for penetrable engagement with a slot in the plate. An aperture in the tang extending through the plate is engageable with the shackle of a lock to preclude removal of the plate.

11 Claims, 4 Drawing Sheets

SECURITY DEVICE FOR ELECTRICAL CONDUCTORS IN A CONDUIT

BACKGROUND OF THE INVENTION

1. Field of the Invention

The present invention is related to security devices, and more particularly, to a security device for preventing access to electrical conductors behind a cover on a conduit.

2. Description of Related Prior Art

Lamp posts in public areas, such as parking lots, parks and other locations generally not frequented during nighttime are susceptible to vandalism and theft. Usually, a series of lamp posts are electrically interconnected by electrical conductors extending underground between the lamp posts. These electrical conductors are of insulated copper or aluminum. The generally long runs between lamp posts require that the gauge of the copper or aluminum electrical conductors be much larger than 10 gauge.

Most lamp posts include electrical conductors extending from a location close to the base up to the fixtures supporting a lamp or lamps. The underground electrical conductors are snaked through the underground conduits between lamp posts and between the lamp post and a source of electric power. The underground electrical conductors are electrically joined with the wires within the hollow lamp post close to the ground. Access for such junctions is provided through an access port in the wall of the lamp post. Generally, a cover extends across this access port and is secured by sheet metal screws or the like.

It is therefore evident that access to the electrical conductors is a simple matter of removing the cover from lamp posts of interest and cutting the wires. Thereafter, the wires can be pulled out and removed.

Because the prices of copper and aluminum are significant, thieves cut the wires between lamp posts and pull the wires out of the ground for subsequent resale. The costs to replenish these electrical conductors along with the costs of the labor involved in doing so is significant. A deterrent to prevent such theft would be of significant benefit to prevent both such theft and the loss of illumination in public areas until repairs can be effected.

Aside from lamp posts, electrically illuminated or otherwise electrically energized above ground signs include conduits extending therefrom for housing electrical conductors connected to a source of electrical power or other signs. Access to such electrical conductors for maintenance, repair or replacement is provided by access ports in the conduit.

As with lamp posts, thieves can easily remove any cover on an access port to cut and withdraw the exposed electrical conductors. The costs for any repair to damage done and the costs for replacing the electrical conductors is significant.

SUMMARY OF THE INVENTION

A security device encircles a lamp post to enclose a cover in the lamp post that, upon removal, provides access to electrical conductors within the lamp post. Most lamp posts are of standard 4-inch square tubing and the cover extends across one side of the tubing. A U-shaped bracket encircles three sides of the lamp post and is secured thereto by a plate extending across the fourth side. The plate nests within a channel at the bottom of the opening and includes a slot for receiving an apertured tang from a fitting attached to the top of the bracket. Upon mounting of the plate, a padlock may be used to engage the aperture in the tang and thereby prevent sliding movement of the plate off the tang resulting in exposure of the cover attached to the lamp post. For circular or other non-rectangular cross-section lamp posts, the bracket may include two half brackets. One-half of the bracket includes cutouts commensurate with the cross-section of the rear half of the lamp post. A second half bracket includes cutouts commensurate with the cross-section of the front half of the lamp post and includes an opening positionally commensurate with the cover attached to the lamp post. The two half brackets are secured to one another and clamp the lamp post therebetween with machine screws or the like. The opening disposed in the front half of the bracket is closed by a plate in the manner discussed above. Conduits containing electrical conductors for providing electrical power to signs and the like are subject to theft of the electrical conductors through access ports in the conduit. These conduits are generally circular in cross-section. The security device particularly adapted to such conduits includes a U-shaped bracket having half round cutouts in the top and bottom surfaces to mate with one half the cross-section of the conduit. Each of top and bottom plates include half round cutouts to mate with the other half cross-section of the conduit. A plate across the front of the bracket, as described above, prevents sliding movement of the top and bottom plates and may be locked in place, as described above.

With any of the embodiments of this security device, removal of the plate by an authorized repairman is a simple matter of unlocking the lock and disengaging the lock from the tang. Thereby, access to the cover is available to permit its removal to expose the opening or access port in the lamp post or conduit. Thereafter, any necessary electrical work can be performed. On completion of the electrical work within the lamp post or conduit, the cover is reinstalled and the plate mounted on the bracket and secured in place with the padlock to prevent unauthorized access to the electrical conductors.

It is therefore a primary object of the present invention to provide a security device that prevents access to electrical conductors within a lamp post or a conduit.

Another object of the present invention is to provide a lockable security device for shielding a cover for an access port in a lamp post or a conduit.

Still another object of the present invention is to provide a security device for a lamp post or a conduit that is easily mountable in the field.

Yet another object of the present invention is to provide a security device that does not restrict authorized access to electrical conductors within a lamp post or a conduit.

A further object of the present invention is to provide a security device that clamps about a lamp post or a conduit and that does not require any alteration to the lamp post or conduit and yet prevents unauthorized access to electrical conductors therewithin.

A still further object of the present invention is to provide a method for restricting access to electrical conductors within a lamp post or a conduit to authorized personnel.

A yet further object of the present invention is to provide a method for preventing theft of electrical conductors from within a lamp post or a conduit.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
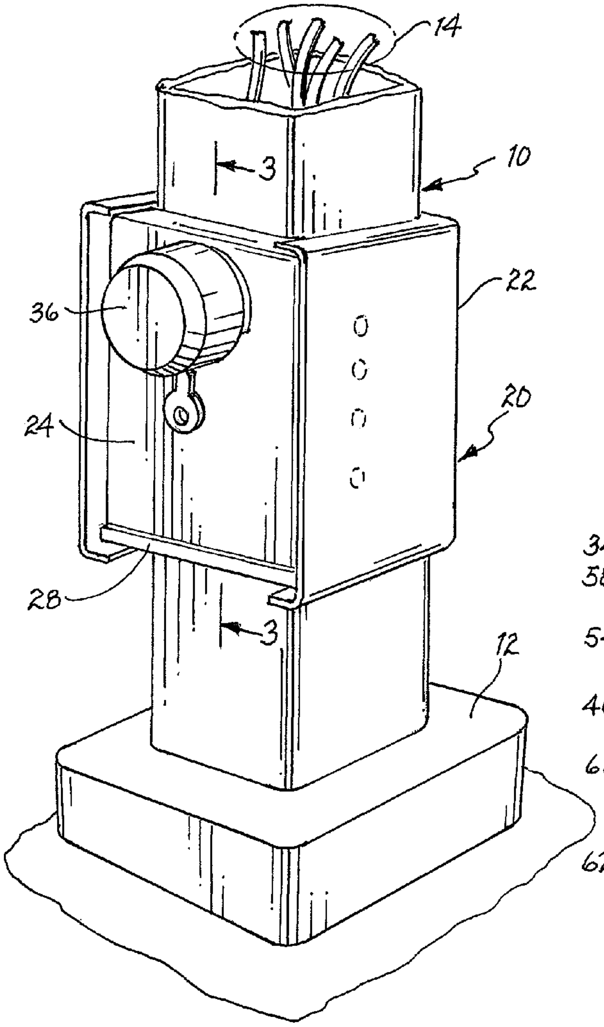
FIG. 1 illustrates a security device mounted on a lamp post.
Figure 2:
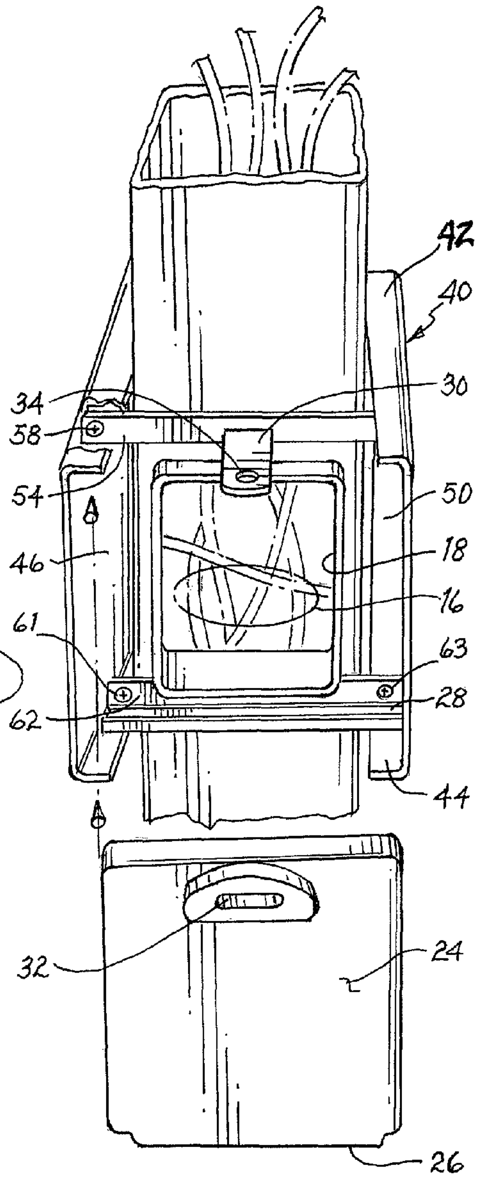
FIG. 2 illustrates the relationship between the security device and the lamp post along with the removable plate.

Referring to FIGS. 1 and 2, there is shown a conventional lamp post 10 mounted on a base 12. Such lamp posts are primarily of a utilitarian nature and most often used in parking lots and public parks. These utilitarian lamp posts are 4-inches square and include electrical conductors 14 extending upwardly therewithin and connected to light fixtures at the top of the lamp post. The source for electrical power is provided by underground electrical conductors extending into the base of the lamp post. These electrical conductors are representatively identified by numeral 16. An opening or access port 18 is disposed close to the bottom of lamp post 10 to provide access to both electrical conductors 14 and 16. By use of wire nuts or the like, electrical conductors 14 are connected to electrical conductors 16 to provide electric power to the light fixtures.

When a plurality of lamp posts 10 are located in a generally common area, such as a parking lot or a city park, electrical conductors 16 are routed underground and interconnect numerous light posts to provide electrical power to the light fixtures of each lamp post. Unfortunately, access to port 18 amounts to little more than removing a cover (not shown). With such access, thieves are known to cut electrical conductors 16 in adjacent light posts and pull out the interconnecting electrical conductors for sale of the copper or aluminum, depending on the type of electrical conductors. The costs for replacement electrical conductors and the labor involved in rewiring the lamp posts is significant. The function and purpose of the present invention is to prevent or least deter access to electrical conductors 16 and theft thereof.

FIGS. 1 and 2 illustrate security device 20 mounted on and encircling a conventional representative 4-inch square lamp post 10; other sized lamp posts, whether square or rectangular in cross-section are or may be in use. The security device includes a bracket 22 extending about three sides of the lamp post. The fourth side is essentially open to provide access to port 18. It is to be understood that port 18 in the lamp post is conventionally closed by a cover attached to the lamp post by a pair of sheet metal screws or the like. Thus, an electrician would have access to the electrical conductors within the lamp post behind port 18 to perform whatever maintenance or replacement may be necessary. Unfortunately, port 18 also provides access to a thief to steal the electrical conductors.

The fourth side of bracket 22 is closed by a plate 24, the lower edge 26 of which is supported within a channel 28. A tang 30 extends from bracket 22 for penetrable engagement with slot 32 in plate 24. The tang includes an aperture 34 located exterior of plate 24. This aperture may be engaged by the shackle of a padlock 36. The lock illustrated is Model No. 6271NKA manufactured by Master Lock of Milwaukee, Wis.; however, other conventional locks may also be used. Thereby, removal of plate 24 cannot come about except upon destruction of plate 24 or bracket 22. Thereby, security device 20 serves as a deterrent to unauthorized access to port 18 and the electrical conductors within lamp post 10.

Referring jointly to FIGS. 2, 3, 4 and 5, details of security device 20 will be described. A three-sided shroud 40 includes a top flange 42 extending inwardly to define a three-sided space conforming with the dimensions of three sides of the lamp post. A similar bottom three-sided flange 44 extends inwardly to define an opening conforming with three sides of the lamp post. This pair of three-sided flanges inhibit access to the interior of bracket 22 and shield structures internal to the bracket. A further flange 46 extends from the interior of side 48 of shroud 40 and is in engagement with upper flange 42 and lower flange 44. A similar flange 50 extends from the interior of side 52 of shroud 40 and is in contact with upper flange 42 and lower flange 44. A strap 54 includes an apertured tang 56 extending therefrom. The strap is secured to flange 46 by a machine screw 58 or the like penetrating strap 54 into threaded engagement with flange 46. Similarly, a machine screw 60 extends through strap 54 into threaded engagement with flange 50. Thereby, strap 54 is secured to bracket 22. A similar strap 62 is secured to the lower end of flange 46 by a penetrating machine screw 61 in threaded engagement with the lower end of flange 46. Strap 62 is also engaged with flange 50 by a further machine screw 63 extending through the strap and into threaded engagement with the lower end of flange 50.

Strap 62 includes a bottom section 64 extending therefrom adjacent both sides of bottom flange 44. The bottom section is terminated by a channel 66. Plate 24 includes a flange 70 extending from side edges and top edge of the plate. The sizing of this flange is commensurate with the interior dimensions of bracket 22 to nest therewithin and enclose lamp post 10 within bracket 22. The plate includes a bottom edge 72 for insertion within channel 66. A slot 74 is formed toward the top of plate 24 to penetrably receive tang 30. The tang extends beyond plate 24 a sufficient distance to permit the shackle of a lock, such as lock 36, to engage aperture 34 of the tang. Thereby, outward pivotal movement of the plate about channel 66 is precluded and access to the interior of security device 20 is not possible. It is to be noted that arced section 76 extending from plate 24 is a function of the configuration of lock 36 which locates the body of the lock essentially adjacent the plate. However, a more conventional padlock engaging aperture 34 of tang 30 would also serve the purpose of preventing outward pivotal movement of the plate.

Figure 6:
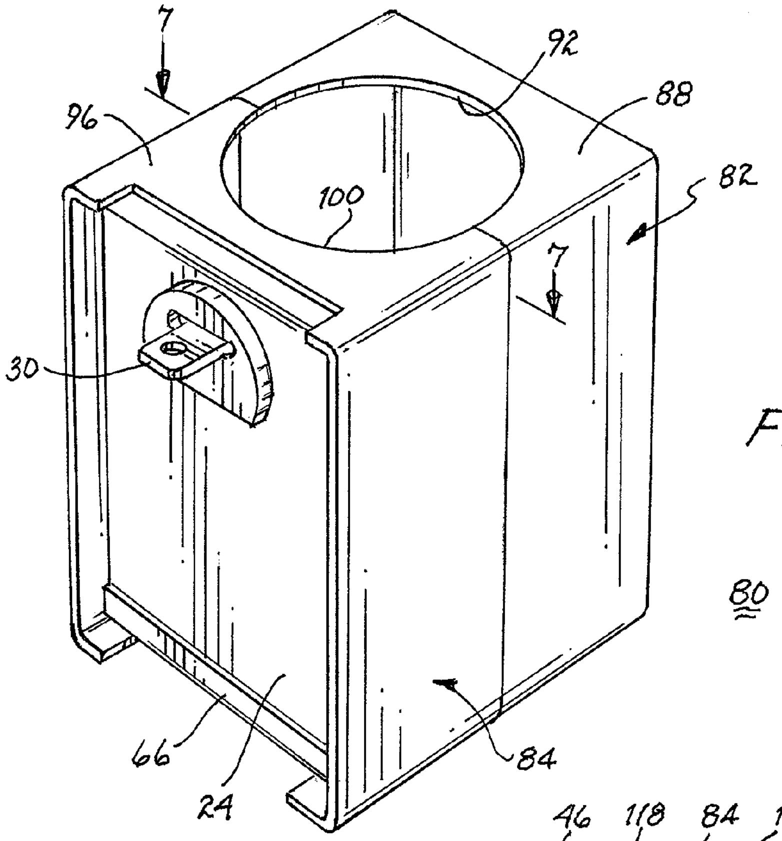
FIG. 6 illustrates a variant of the security device.
Figure 7:
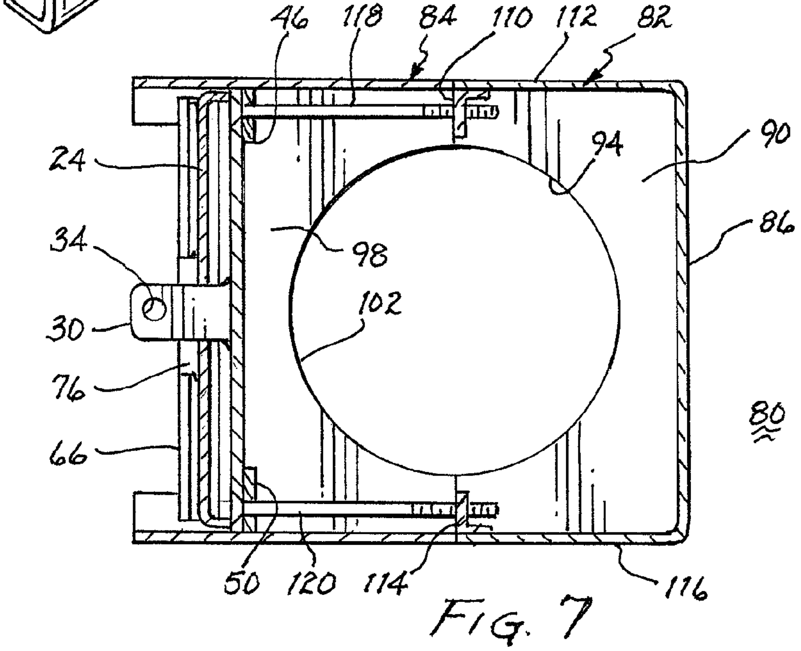
FIG. 7 is a cross-sectional view of the variant security device taken long lines 7-7, shown in FIG. 6.

Some lamp posts are tube-like circular in cross-section. Other lamp posts have different cross-sections such as oval, hexagonal, etc. and primarily for decorative purposes. Referring jointly to FIGS. 6 and 7, there is shown a representative security device 80 for preventing access to the cover and access port in the lamp post behind which are the required electrical conductors. To accommodate a non-square in cross-section lamp post, two half brackets 82, 84 may be used. Half bracket 82 includes a three-sided shroud 86 supporting a top side 88 and a bottom side 90. The top and bottom sides include a cutout 92 and a cutout 94, respectively. The configuration of these cutouts conforms with the rear half of the cross-section of the lamp post to be engaged. As depicted, these cutouts are semi-circular for engaging a lamp post round in cross-section. It is to be understood that differently configured cutouts may be used to conform with the cross-sectional dimensions of a lamp post. Half bracket 84 also includes a top side 96 and a bottom side 98. A cutout 100 is formed in top side 96 and a cutout 102 is formed in bottom side 98. The configuration of cutouts 100, 102 is depicted as being essentially semi-circular to mate with the lamp post having a circular cross-section. As with cutouts 92, 94, cutouts 100 and 102 may be configured to correspond with the configuration of the front half of the lamp post to be engaged.

Figure 3:
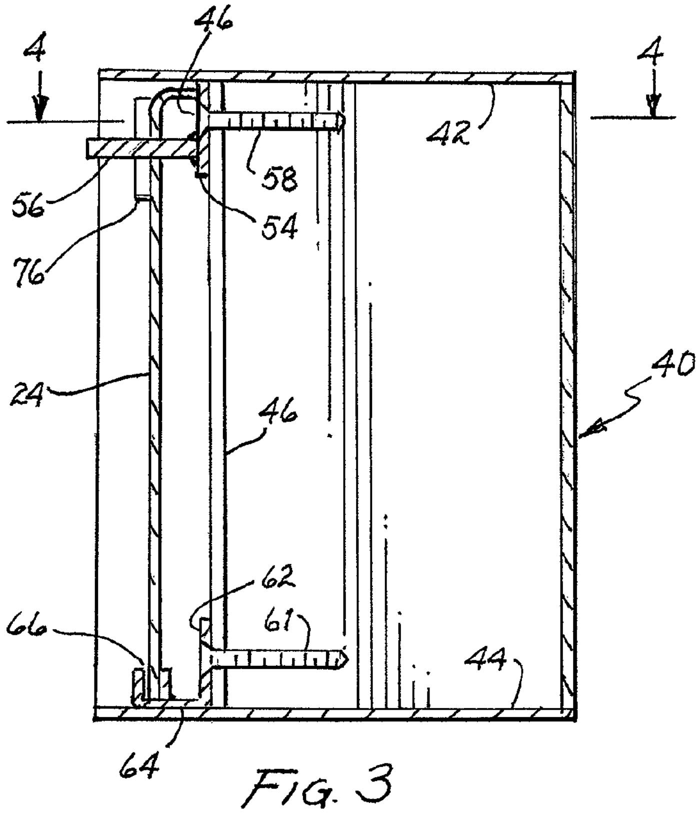
FIG. 3 is a cross-sectional view of the bracket.
Figure 4:
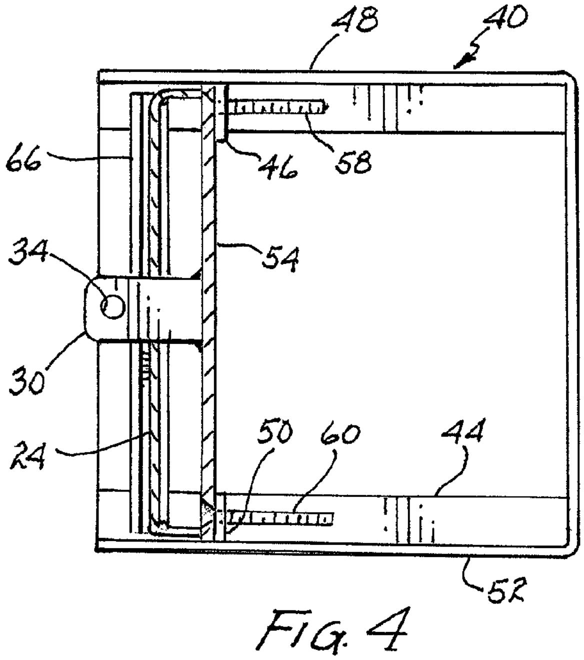
FIG. 4 is a cross-sectional view taken along lines 4-4, as shown in FIG. 3.
Figure 5:
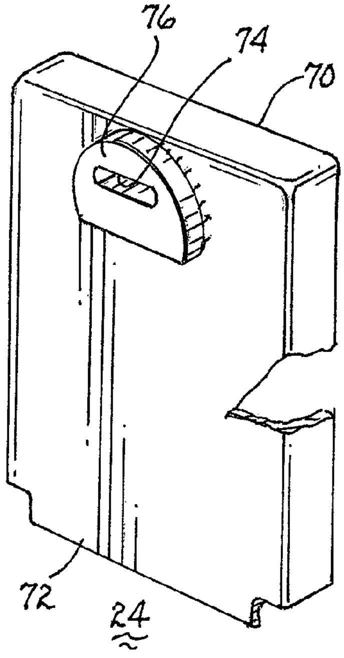
FIG. 5 is an isometric view of the plate.

The front of security device 80 is essentially the same as that described above with regard to security device 20. In particular, a plate 24 rests within channel 66 and is penetrably engaged with tang 30 to accommodate locking of the plate with half bracket 84. Half bracket 82 includes a right angle flange 110 secured to the inside of side 112 of the half bracket. Preferably, such a right angle flange is attached close to the top and close to the bottom of side 112. Similarly, a right angle flange 114 is secured to the inside of side 116 of half bracket 82. Preferably, right angle flange 114 is secured proximate the top and proximate the bottom of side 116. A machine screw 118 extends through flange 46 in the manner of screw 58 (see FIGS. 3 and 4) for threaded engagement with right angle flange 110. Similarly, a machine screw 120 extends through flange 50 for threaded engagement with right angle flange 114. As illustrated in FIGS. 3 and 4, two machine screws engage half bracket 82 along each side to provide rigidity. Thereby, half brackets 82, 84 are robustly joined with one another to minimize the likelihood of damage or removal from about a lamp post due to tampering. It is to be understood that these or other fittings may be used to secure half brackets 82, 84 with one another.

As noted above, cutouts 94, 102 in the top and bottom surfaces of security device 80 may be configured to jointly replicate the cross-section of essentially any lamp post. Thereby, the cover of a lamp post covering the access port to electrical conductors within the lamp post are enclosed within the security device to prevent unauthorized removal and theft of the electrical conductors.

Figure 8:
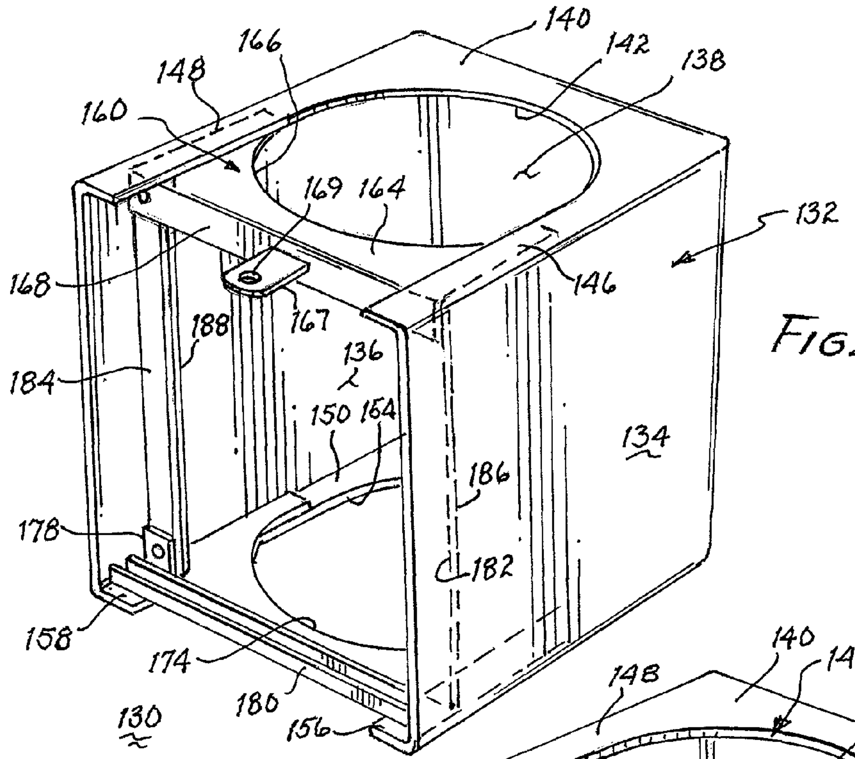
FIG. 8 illustrates a security device for mounting about a circular conduit.
Figure 9:
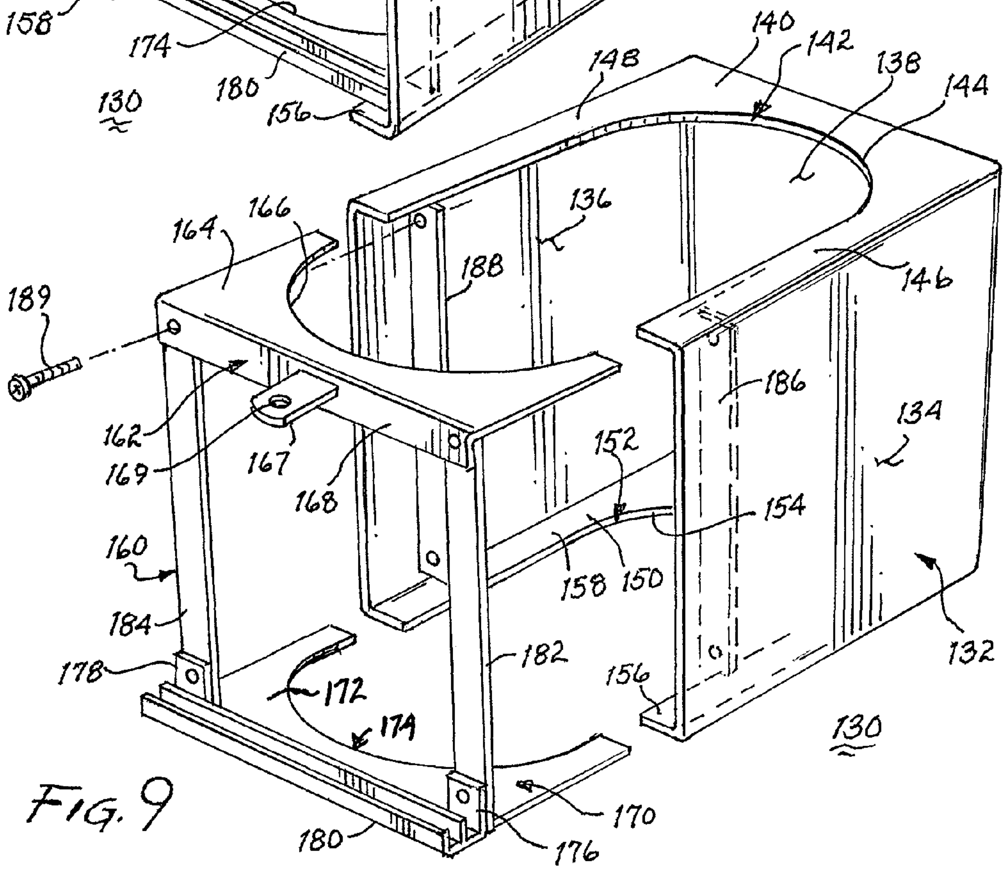
FIG. 9 illustrates the major components of the security device shown in FIG. 8.

Referring jointly to FIGS. 8 and 9, there is shown a variant security device 130 which is particularly useful for encircling a cylinder, whether a conduit or a lamp post and containing electrical conductors accessible through an access port that may or may not have an attachable cover. Security device 130 includes a shroud 132 having three sides 134, 136 and 138 forming a general U-shape. A top surface 140 includes a U-shaped cutout 142 defining at the base a semi-circle 144 and flanges 146 and 148 extending therefrom. Similarly, bottom surface 150 includes a U-shaped cutout 152 defining a semi-circle 154 and flanges 156, 158 extending therefrom. Thereby, shroud 132 will fit snugly about one-half of the conduit or lamp post with which it is used.

A member 160 is slidably engageable with shroud 132 to engage the remaining half circle of the conduit or lamp post. The member includes a first right angle flange 162 having a top side 164. The top side includes a semi-circular cutout 166 sized to mate with a half cylinder of the conduit or lamp post with which the variant security device is to engage. Front side 168 supports a tang 167 having an aperture 169 formed therein for engagement with the shackle of a lock. A second right angle flange 170 includes a bottom side 172 which has a semi-circular cutout 174. Cutout 152 in combination with cutout 174 engages and encircles the conduit or lamp post to which variant security device 130 will be or is connected. Tabs 176 and 178 may be formed as part of the second right angle flange and extend upwardly from bottom side 172. Alternatively, they may be welded to second right angle flange 170. A channel 180 is attached to or formed as part of second right angle flange 170.

Strap 182 interconnects tab 176 with front side 168 and strap 184 interconnects tab 178 with front side 168. Thereby, top side 164 and bottom side 172 are formed as a unit. Straps 186, 188 are attached to and extend from sides 134, 136, respectively. These straps are spaced apart from top surface 140 and bottom surface 150 to provide a small gap therebetween.

To assemble variant security device 130 about a circular conduit or lamp post, shroud 132 is brought into engagement with the rear side of the conduit or lamp post. Thereafter, member 160 is slid into the shroud which sliding motion locates top side 164 intermediate top surface 140 and the ends of straps 186, 188. Simultaneously, bottom side 172 is brought into sliding engagement between bottom surface 150 and the lower ends of straps 186, 188. Thereby, cutouts 142, 166 and cutouts 152, 174 encircle the lamp post.

Member 160 and shroud 132 are in engagement with one another through use of a plurality of bolts, of which bolt 189 is illustrated. These bolts extend through front side 168 and strap 184 into engagement with a threaded aperture in strap 188. A similar bolt extends through the front side and strap 182 into threaded engagement with strap 186. A further bolt extends through tab 178 and strap 184 into threaded engagement with the lower end of strap 188. A yet further bolt extends through tab 176 and strap 182 into threaded engagement with the lower end of strap 186.

As particularly shown in FIG. 8, the opposed side edges of top side 164 are protected by flanges 146, 148. Similarly, the opposed side edges of bottom side 172 are protected by flanges 156, 158. With such protective arrangement, unauthorized intrusion to the interior of variant security device 130 is essentially precluded.

As discussed above and illustrated in FIGS. 1, 2, 3 and 4, a plate like plate 24 shown therein is brought into engagement with channel 180 and tang 167 to close the fourth side of the variant security device. Removal of the plate is precluded by engaging the shackle of a lock with aperture 169 in tang 167, as discussed in further detail above. It is to be understood that the dimensions of the semi-circular cutouts attendant variant security device 130 would be dictated by the diameter of the conduit or lamp post with which the security device is to be engaged. Furthermore, while the cutouts have been discussed as providing a circular aperture in the top and bottom of the security device, it is to be understood that the cutouts may be differently configured to accommodate different cross-sectional shapes of a conduit or lamp post. All that is necessary is that each cutout be shaped commensurate with the corresponding cross-sectional half of the conduit or lamp post with which variant security device is to be used.

I claim:

1. A security device for covering an access port in a conduit or lamp post, said device comprising:

(a) a bracket having an open side for receiving the conduit or lamp post, which open side is coincident with the access port;

(b) at least one strap displaced from the access port for securing said bracket to the conduit or lamp post;

(c) a tang extending from one of said straps and including an aperture for engagement by the shackle of a padlock; and (d) a plate engaging said bracket to cover the open side of said bracket, said plate including a slot for penetrable engagement by said tang.

2. The security device as set forth in claim 1 wherein said bracket includes a back side, a left side and a right side and including a first flange extending inwardly from said left side and a second flange extending inwardly from said right side, one of said straps being detachably attached to said first and second flanges above the access port, and an other of said straps being detachably attached to said first and second flanges below the access port.

3. The security device as set forth in claim 2 including machine screws penetrably engaging said straps and threaded apertures disposed in said first and second flanges for threadedly securing said straps to said first and second flanges.

4. The security device as set forth in claim 1 wherein said plate includes a lower edge and including a channel extending across the open side of said bracket for supporting said lower edge.

5. The security device as set forth in claim 4 including a pair of side walls extending into said bracket from opposed sides of said plate and a top wall extending from the top of said plate into said bracket, said pair of side walls and said top wall being located within said bracket upon mounting of said plate with said bracket.

6. The security device as set forth in claim 1 including a padlock for receiving said tang to locate said padlock essentially adjacent said plate and a shackle of said padlock for engaging the aperture in said tang.

7. The security device as set forth in claim 1 wherein said bracket includes three sides for defining a rectangular opening commensurate with the cross-section of a lamp post.

8. A security device for preventing access to a cover on a conduit or lamp post, said device comprising:

(a) a bracket for surrounding the conduit or lamp post coincident with the cover on the conduit or lamp post;

(b) said bracket including an opening positionally corresponding with the cover;

(c) a plate detachably attachable to said bracket and extending across the opening, said plate including a slot; and (d) a tang extending from said bracket for penetrable engagement with said slot in said plate, said tang including an aperture adapted for engagement by the shackle of a padlock.

9. The security device as set forth in claim 8 wherein said plate includes a bottom edge and a top edge and wherein said tang is proximate said top edge and wherein said bracket includes a channel for receiving and retaining said bottom edge of said plate.

10. The security device as set forth in claim 9 including straps extending across the opening of said bracket for securing said bracket to the conduit or lamp post.

11. Apparatus for preventing access through a cover to the electrical conductors within a conventional conduit or light post, said apparatus comprising:

(a) a bracket for encircling the conduit or light post, said bracket including an opening proximate the cover on the light post;

(b) a tang extending from said bracket and having an aperture for engagement by the shackle of a padlock; and (c) a plate for engaging said bracket to overlie the opening in said bracket, said plate including a slot penetrably engageable by said tang.

* * * * *